(12) United States Patent
Pate

(10) Patent No.: US 7,011,434 B2
(45) Date of Patent: Mar. 14, 2006

(54) NON-IMAGING PHOTON CONCENTRATOR

(75) Inventor: Michael A Pate, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/196,373

(22) Filed: Aug. 2, 2005

(65) Prior Publication Data
US 2005/0276050 A1  Dec. 15, 2005

Related U.S. Application Data

(62) Division of application No. 10/327,418, filed on Dec. 20, 2002.

(51) Int. Cl.
F21V 7/00 (2006.01)

(52) U.S. Cl. ............... 362/297; 362/296; 362/346; 385/901

(58) Field of Classification Search ........... 362/296, 362/297, 341, 346; 385/901
See application file for complete search history.

(56) References Cited

U.S. PATENT DOCUMENTS

| 3,437,804 | A | 4/1969 | Schaefer et al. |
| 5,307,210 | A | 4/1994 | MacFarlene et al. |
| 5,317,484 | A | 5/1994 | Davenport et al. |
| 5,406,462 | A | 4/1995 | Fallahi et al. |
| 5,699,201 | A | 12/1997 | Lee |
| 5,810,469 | A | 9/1998 | Weinreich |
| 5,842,767 | A | 12/1998 | Rizkin et al. |
| 5,871,266 | A | 2/1999 | Negishi et al. |
| 5,903,091 | A | 5/1999 | MacLennan et al. |
| 5,971,551 | A | 10/1999 | Winston et al. |
| 6,005,722 | A | 12/1999 | Butterworth et al. |
| 6,022,123 | A | 2/2000 | Tomioka et al. |
| 6,123,436 | A | 9/2000 | Hough et al. |
| 6,129,437 | A | 10/2000 | Koga et al. |
| 6,356,700 | B1 | 3/2002 | Strobl |
| 6,384,320 | B1 | 5/2002 | Chen |
| 6,554,456 | B1 | 4/2003 | Buelow et al. |
| 6,719,429 | B1 | 4/2004 | Peterson |

FOREIGN PATENT DOCUMENTS

| EP | 0736415 | 10/1996 |
| WO | WO 02/086610 | 10/2002 |
| WO | WO 02/086617 | 10/2002 |

Primary Examiner—John Anthony Ward
(74) Attorney, Agent, or Firm—Timothy F. Myers

(57) ABSTRACT

A photon concentrator includes an imaging photon concentrator concentrating photons from a source to an image point and a non-imaging photon concentrator. The non-imaging photon concentrator (NIPC) has an entry aperture coupling to the imaging photon concentrator near the image point. The NIPC also includes an exit aperture wherein the entry aperture is larger than the exit aperture.

20 Claims, 12 Drawing Sheets

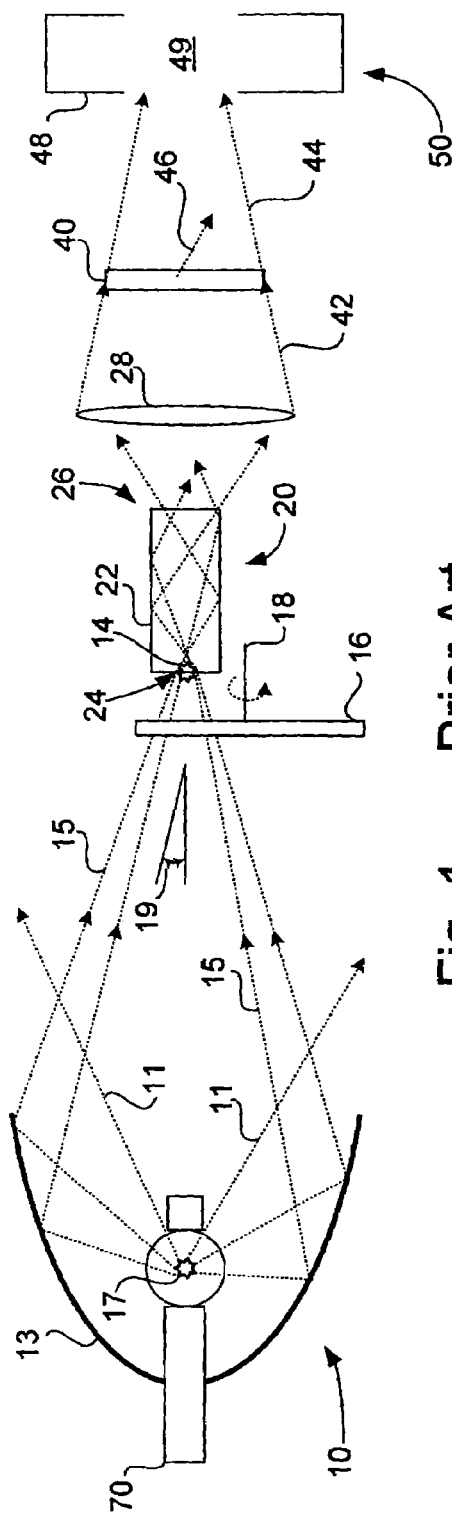
Fig. 1 -- Prior Art --
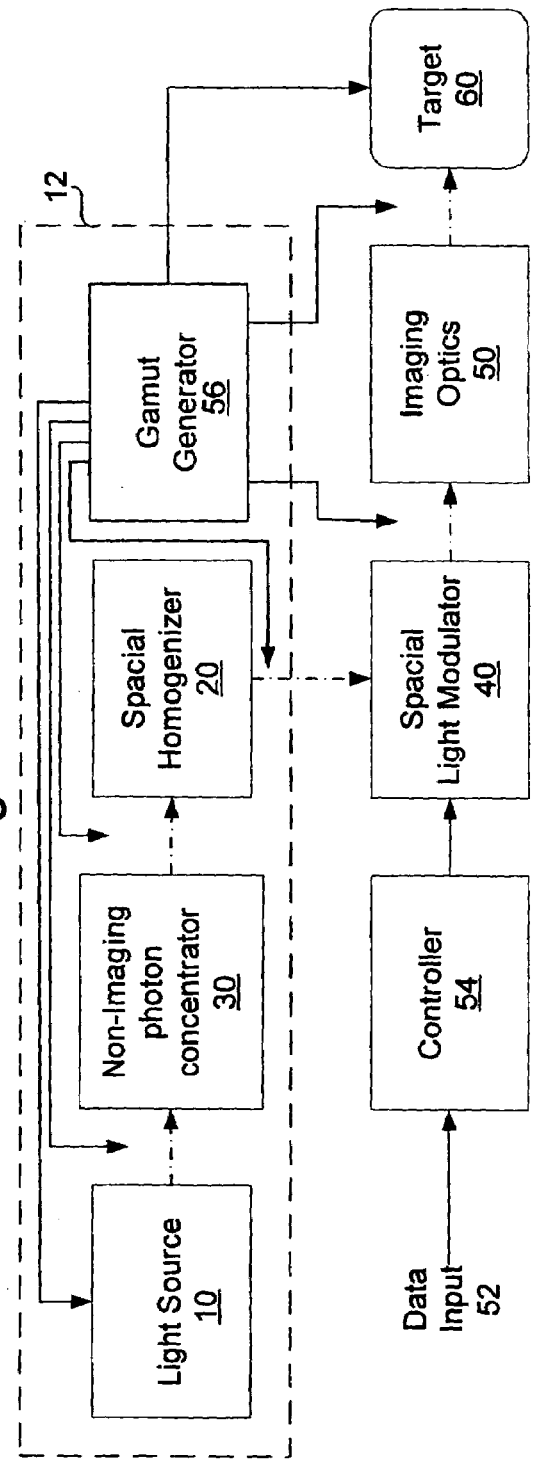
Fig. 2

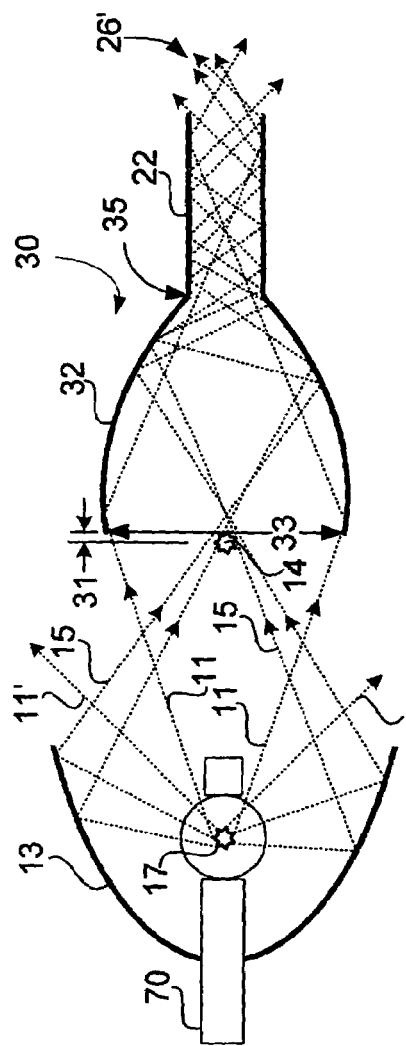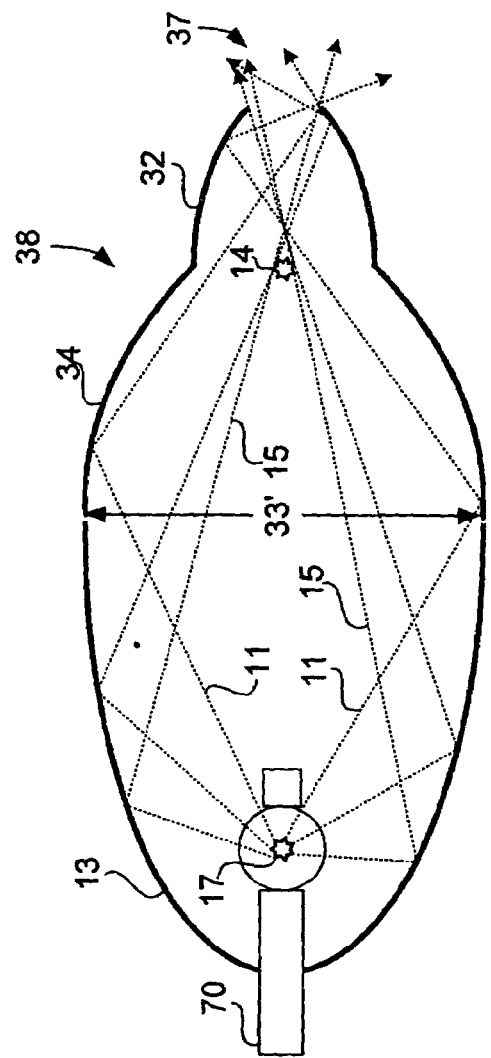

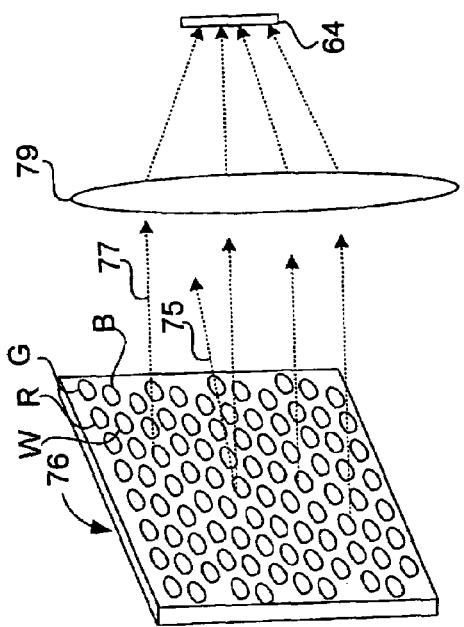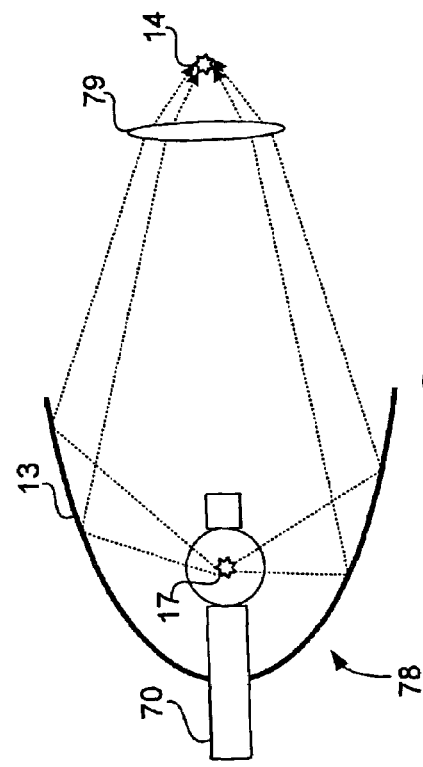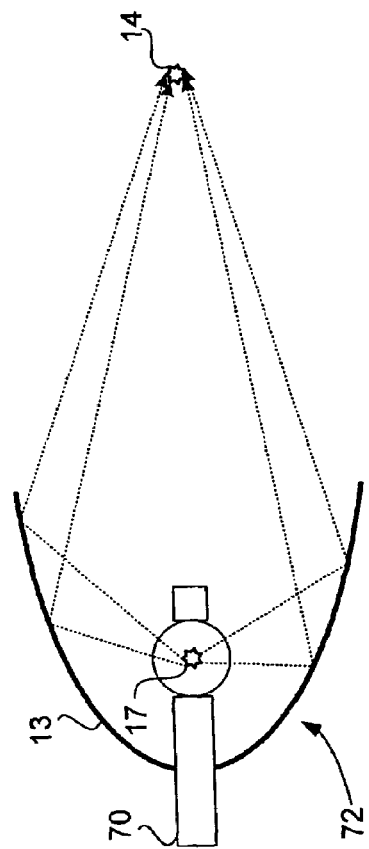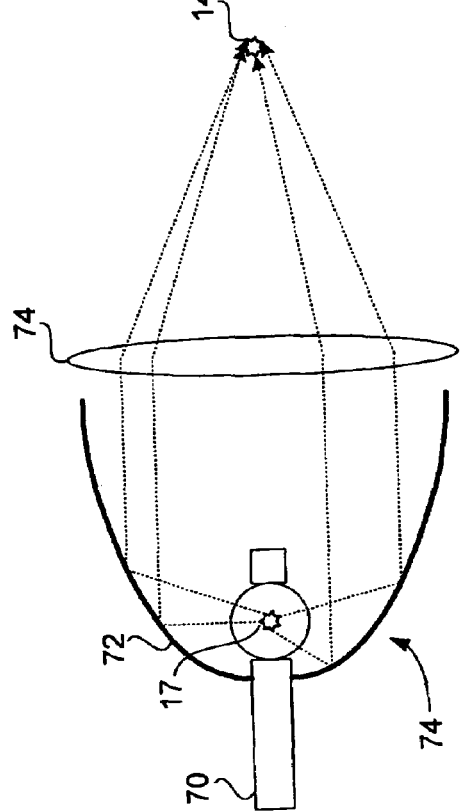
Fig. 8A
Fig. 8B
Fig. 8C
Fig. 8D

Winston Collector

Pate Collector

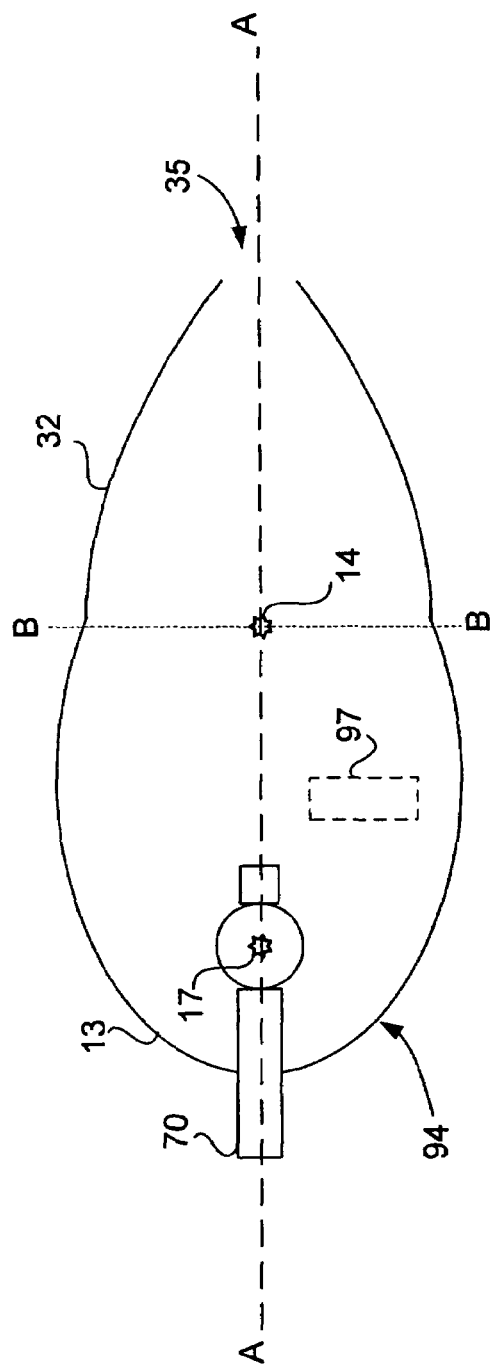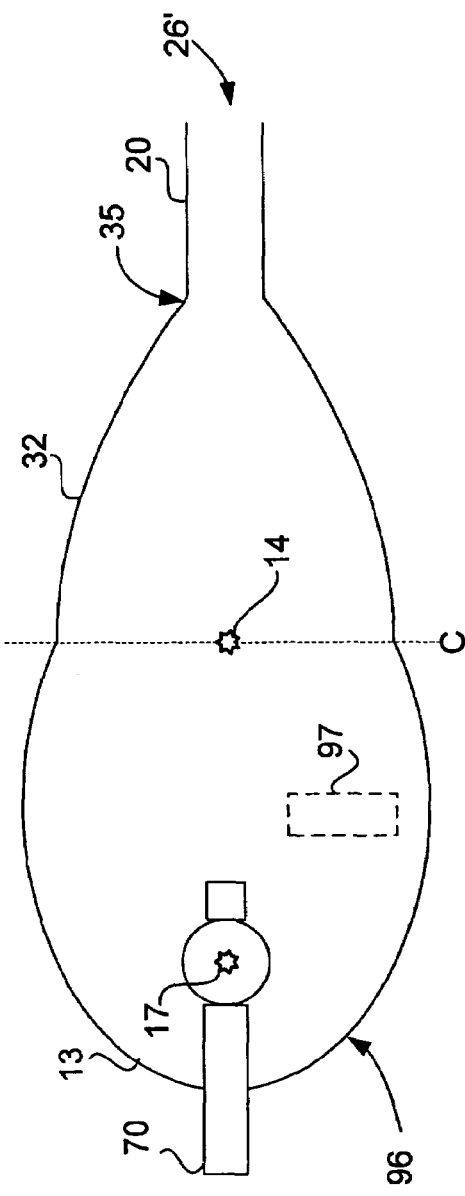
Fig. 12
Fig. 13

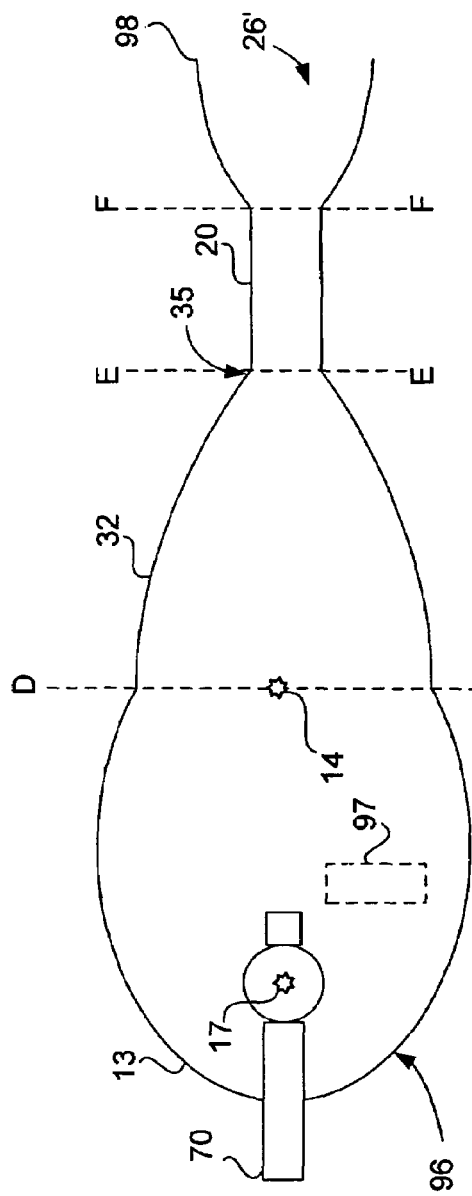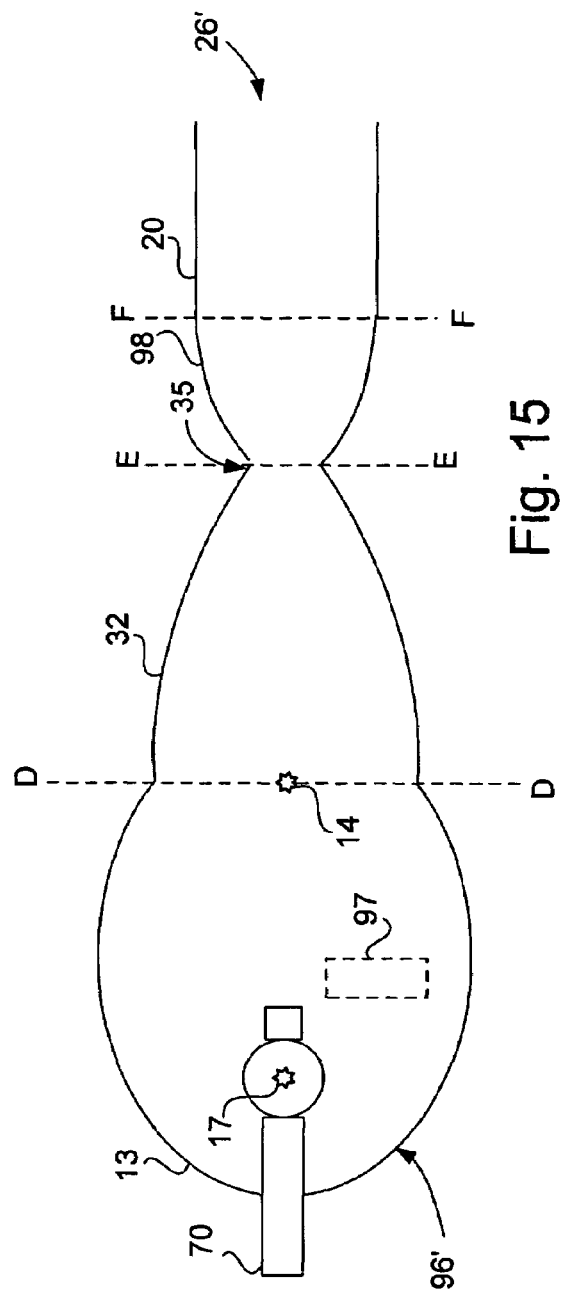

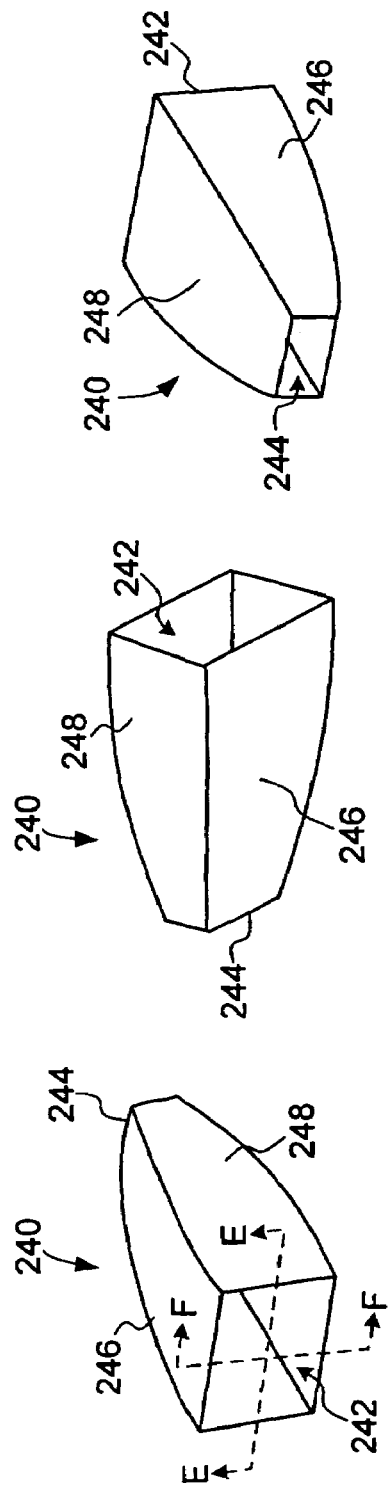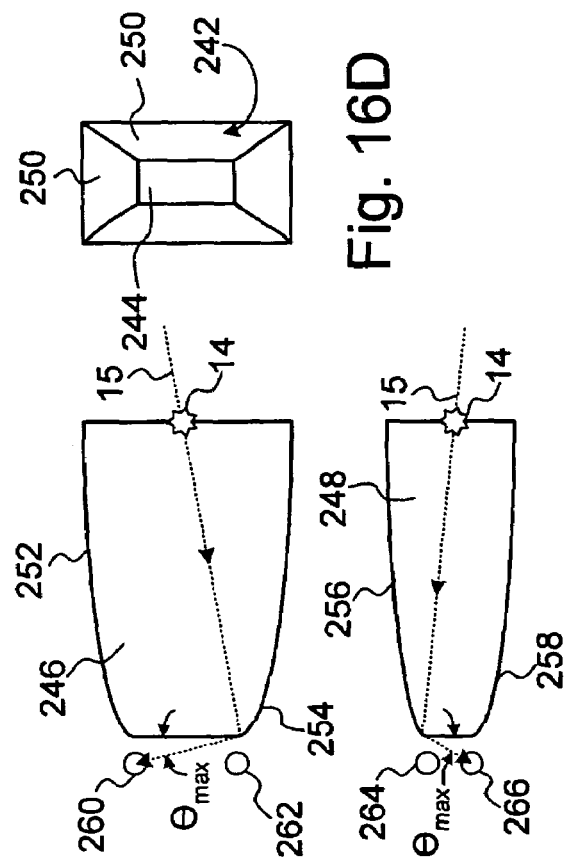

NON-IMAGING PHOTON CONCENTRATOR

This application is a divisional of Ser. No. 10/327,418, filed Dec. 20, 2002, which is hereby incorporated by reference.

BACKGROUND OF THE INVENTION

The present invention relates to optical display systems. More specifically, the present invention relates to an optical display system with improved light projection efficiency.

A typical projection system includes an arc-lamp source of bright white light, a method for separating the white light into red, green and blue spectral components, and a spatial light modulator (SLM, also called a light valve) for two dimensional imaging each of the spectral components to create a color picture. The SLM performs the spatial and temporal modulation in response to an analog or digital video signal generated by a computer or another video source such as a TV tuner, VCR, HDTV broadcast, or DVD player. The SLM creates sequential images typically in red, green and blue color planes although other color separation techniques exist such as cyan, yellow, magenta and optionally white planes. The color planes may then be recombined optically and projected onto a screen, or they may be flashed temporally in sequence onto the screen at such a rate that a viewer perceives only a single image.

There are several problems with existing arc-lamp sources. The most commonly used lamp source is a mercury vapor arc lamp. This lamp produces the most light for a given wattage and has a small point source. However, it has a short lifetime compared to other technologies and produces light that is spectrally deficient in the red spectrum. In addition, mercury is a hazardous material that many countries would like limit the use of or ban outright. Although other bulb technologies could be substituted for the mercury vapor arc lamp, none have its efficiency and small spot size that allow for production of small high intensity projectors. Therefore, there is a need for a solution that allows other bulb technologies to compete with mercury vapor arc lamps.

Most digital projectors compete on the basis of the number of screen lumens that the projector places on the projection screen. Although the competition in the projector market is fierce, cost considerations as well as size constraints have limited the development of more efficient optical designs for other light sources.

There exists a need to overcome the problems associated with arc lamp bulbs, particularly mercury vapor types. Simply replacing the arc lamp bulb with a non-arc lamp will not offer a satisfactory competitive solution because of the non-point source nature of non-arc lamps.

BRIEF DESCRIPTION OF THE DRAWINGS

The invention is better understood with reference to the following drawings. The elements of the drawings are not necessarily to scale relative to each other. Rather, emphasis has instead been placed upon clearly illustrating the invention. Furthermore, like reference numerals designate corresponding similar parts through the several views.

FIG. 1 is an exemplary cross-sectional schematic view of a conventional projection system.

FIG. 2 is an exemplary block diagram of a projection system that includes an embodiment of the invention.

FIG. 3 is an exemplary cross-sectional schematic view of an embodiment of the invention.

FIG. 4 is an exemplary cross-sectional schematic view of an alternative embodiment of the invention.

FIGS. 5A–5F are exemplary cross-sectional views of locating a color wheel for various embodiments of the invention.

FIGS. 8A–8D are exemplary embodiments of various light sources that can be used with the embodiments of the invention.

FIGS. 12–15 are exemplary integrated reflectors for light sources that incorporate embodiments of the invention.

FIGS. 16A–16F are prospective, front and cross-sectional views of an exemplary integrated NIPC and spatial homogenizer embodiment of the invention.

DETAILED DESCRIPTION OF THE PREFERRED AND ALTERNATIVE EMBODIMENTS

Figure 6D:
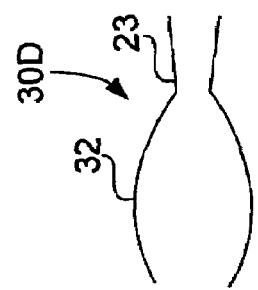
FIGS. 6A–6E are exemplary cross-sectional views of various alternative embodiments of the invention.

The following is a detailed description of the best presently known modes of carrying out the inventions. This description is not to be taken in a limiting sense, but is made merely for the purpose of illustrating the general principles of the invention. It is noted that detailed discussions of projection systems components that are not pertinent to the present invention have been omitted for the sake of simplicity. The present invention is also applicable to a wide range of display technologies and presentation systems, including those presently being developed or yet to be developed. For example, although various exemplary projection systems are described below with reference to digital micro-mirror projectors, other types of spatial light modulators (SLMs) such as magnetorehological, diffractive, transmissive, holographic, etc are equally applicable to the present invention.

The optical devices in embodiments of the present invention are applicable to a broad range of optical devices technologies and can be fabricated from a variety of optic materials. The following description discusses several embodiments of the optical devices of the present invention as implemented in reflective embodiments, since the majority of currently available optical devices are fabricated in reflective optics and the most commonly encountered applications of the present invention will involve reflective optics. Nevertheless, the present invention may also advantageously be employed in refractive, diffractive, holographic, and combinations of reflective and the aforementioned technologies. Accordingly, the present invention is not intended to be limited to those devices fabricated in reflective optics, but will include those devices fabricated, alone or in combination, in one or more of the available optic methods and technologies available to those skilled in the art.

It should be noted that the drawings are not true to scale. Further, various parts of the optical elements have not been drawn to scale. Certain dimensions have been exaggerated in relation to other dimensions in order to provide a clearer illustration and understanding of the present invention. Further, reflective surfaces for particular embodiments are shown in bolder line widths to indicate reflective coatings. Other embodiments may also have reflective surfaces that are not shown for simplicity in the description but are not meant to be limited to no reflective coating.

In addition, although the embodiments illustrated herein are shown in two-dimensional views with various regions having length and width, it should be clearly understood that these regions are illustrations of only a portion of a device that is actually a three-dimensional structure. Accordingly, these regions will have three dimensions, including length, width, and depth, when fabricated on an actual device. Although, most three dimensional structures will be transverse rotations of the two dimensional structures shown, other three dimension structures having similar longitudinal cross-sectional portions exist, such as transverse rectangular shapes (e.g. extending the transverse cross-section linearly in depth and width dimensions), and are to be viewed as falling within the scope and spirit of the invention.

Further, although different embodiments are shown in cross-section along the longitudinal axis, different sections of the embodiment may have transverse cross-sectional profiles. For instance, for an integrated NIPC and integrating rod, the NIPC may have a circular transverse cross-section and the integrating rod may have a rectangular transverse cross-section. The present embodiments illustrated are meant to cover the various possible transverse cross-sectional combinations possible and still remain within the scope and spirit of the invention.

Moreover, while the present invention is illustrated by preferred embodiments directed to projector devices, it is not intended that these illustrations be a limitation on the scope or applicability of the present invention. It is not intended that the projector devices of the present invention be limited to the physical structures illustrated. These structures are included to demonstrate the utility and application of the present invention to presently preferred and alternative embodiments.

FIG. 1 is a schematic diagram of an optical display system found in typical conventional projection devices. The optical display system includes a light source 10, a color wheel 16, a spatial homogenizer 20, an SLM 40 and imaging optics 50. The light source 10 includes an elliptical reflector 13 and a bulb 70. The bulb 70 is usually a mercury-vapor arc lamp that produces a small fireball 17 at a first focal point (object point) of the ellipse of preferably white light that is imaged (focused) to a second focal point to create an image point 14 at the entrance of the spatial homogenizer 20. The light source 10 creates both a set of focused light rays 15 that converge to the image point 14 and stray light rays 11 that do not converge to the image point 14. The color wheel 16 is rotated about a color wheel axis 18 to present one or more color sections (such as red-green-blue, red-green-blue-white, or red-green-blue-red-green-blue, to name a few) in order to convert the white light from light source 10 to a temporal sequence of colors. Mercury lamps, however, are usually deficient in the amount of red spectrum produced, thus creating off-white light that must be corrected by the color wheel or other mechanism. The color wheel 16 is one of a number of gamut generators 56 (see FIG. 2) that can produce a sequence of colors. The spatial homogenizer 20 is shown as an integrating rod 22 that is used to create a uniform intensity in the light rays emitted from the cross-sectional profile of exit 26.

The focused light at the image point 14 enters the integrating rod 22 at entry 24 at a first angle 19 (usually called a cone half-angle) based on the optical design of the elliptical mirror. Typically, the integrating rod 22 has a rectangular transverse cross-section profile (as opposed to the longitudinal cross-section shown) to convert the light into a rectangular image for focusing on a correspondingly ratioed rectangular shaped SLM 40. Most integrating rods 22 are constructed as hollow rectangular boxes and coated inside with a highly reflective coating to allowing incoming light rays to reflect off the surfaces thus spatially homogenizing the light in order to evenly distribute it over the cross-sectional exit aperture to create a uniform intensity in the cross-section of light rays leaving the exit 26 of the integrating rod 22. Generally, for conventional rectangular integrating rods 22, the light exits from exit 26 at first angle 19. The light rays leaving the integrating rod are then imaged into a set of uniform light rays 42 with a condensing lens 28 or other optics to fill the area occupied by the active elements of the SLM 40. This imaging is performed by having the height and width of the integrating rod 22 matched in ratio to the dimensions of the SLM 40. The reflected light 44 leaving the SLM 40 is then optically coupled into imaging optics 50 such that the reflected light 44 is substantially captured in the imaging optics aperture 49 of projection optics 48. Deflected light 46 is directed away from the imaging optics aperture 49 so it is not projected. Although the SLM 40 is described as reflective, the optical path shown is unfolded for ease of understanding. An actual design would require the light to reflect off SLM 40 at compound angles.

One problem with conventional projection systems is that the light source 10 must have a practically ideal point source or plasma fireball 17 in order for most of the light from the light source 10 to enter the entry 24 of the integrating rod 22. If the projection system is not designed efficiently, much of the light from the bulb 70 never reaches the imaging optics aperture 49. Most conventional small projector systems have a total optical system efficiency from bulb to screen of less than 12%. That is, only up to 12% of the light created by the bulb 70 actually exits from the projection optics and makes it to the screen. This inefficient design results in not only a dimmer display but also the consumption of needlessly wasted power. Several approaches have been attempted to increase the efficiency but with little success.

For instance, if the integrating rod is increased in size to gather more of the beam from the lamp focus then the magnification of the illumination system must be changed. Changing the magnification of the illumination system requires changes in optical path length of the system and the effective focal length of the lenses used in the system. These changes may or may not be practicable in products with small profiles or even in large profile digital projectors. Therefore, the need to capture more light from the lamp focus and couple it into the same size integrating rod with increased luminance is desired in all digital projectors.

The following embodiments of the invention allow for the collection of more light from the light source 10, and route it so that the light is optimally used within the optic system. The embodiments increase the efficiency of digital projectors by collecting more light at the focus of the lamp by using non-imaging optics. This light collection increases the amount of screen lumens a digital projector or other display device can deliver. More luminous flux from the spatial homogenizer is produced without having to change the magnification in the illumination system nor growing the overall package size.

For instance, projectors using the invention may have a total system efficiency of greater than 15% with minor changes to the optical system. This increased efficiency allows for a brighter image or less power consumption.

These embodiments use a non-imaging photon concentrator (NIPC), for example a rotationally symmetric (in the transverse as opposed to longitudinal direction) compound parabolic concentrator (CPC), to capture most of the light at the image point of an imaging digital projector lamp. One embodiment uses a rotationally symmetric over-rotated compound parabolic concentrator with a re-entrant entry profile defined herein as a "Pate" collector. As used within this specification, "collector" is synonymous with "concentrator" unless the use of "collector" indicates otherwise. It should be understood that the light at the image point of the imaging light source is not an actual point image but rather an extended area image about 6 mm in diameter having a non-spherical three-dimensional volume with a practically pointed Gaussian type intensity profile. The NIPC entrance aperture is located at or near the focus (image point) of the lamp and reflects the light towards the exit aperture of the NIPC. The exit aperture of the NIPC is preferably but optionally designed so that its diameter is the same size as the spatial harmonizer's smallest height or width dimension. For instance, with a CPC and integrating rod, the rectangular tube of the integrating rod is physically located with its entrance aperture at the CPC exit aperture and substantially all of the light exiting from the CPC is coupled into the integrating rod so that at the exit of the integrating rod the light has a uniform intensity profile across its cross-sectional profile. Preferably, the longitudinal length and transverse shape parameters of the NIPC are adjusted to maximize the light capture from the lamp, minimize optical length along the optical axis for small packaging applications, and efficiently couple this light to the integrating rod for homogenization. For example, the transverse shape can be circular, rectangular, square, octagonal, or otherwise. If non-circular, the function of the spatial homogenizer and the NIPC can be combined into a single integrated unit. This type of embodiment is discussed in more detail in FIG. 16. Also, the transverse shape for a particular embodiment may have one or more sections of different transverse shapes thus allowing for further design flexibility.

Several different NIPC designs can be used depending on the desired level of concentration desired and restriction on the exit angle required for a given system. A conventional compound parabolic collector is also called a Winston collector after one of its primary proponents for its use in solar collection systems (see U.S. Pat. No. 4,281,640, entitled "Electromagnetic Radiation Collector System"). Other NIPCs include compound elliptical collectors, compound hyperbolic collectors, tube collectors, and total internal reflection collectors, just to name a few. In solar collection systems, CPC efficiencies have shown a concentration ratio or collection efficiency of three to five times that of conventional optics. NIPC's allow for the collection and concentration of both direct and diffuse light without angular adjustment to provide for maximum efficiency light transfer. NIPCs are sometimes referred to as convergent waveguides, light concentrators, non-lens focuser, and illumination rather than imaging optics.

Figure 10A:
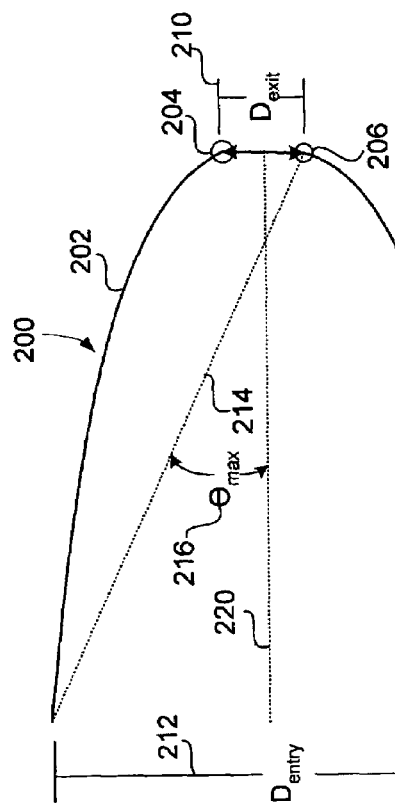
FIG. 10A is a cross-sectional view of a conventional compound parabolic concentrator also known as a Winston collector.
Figure 10B:
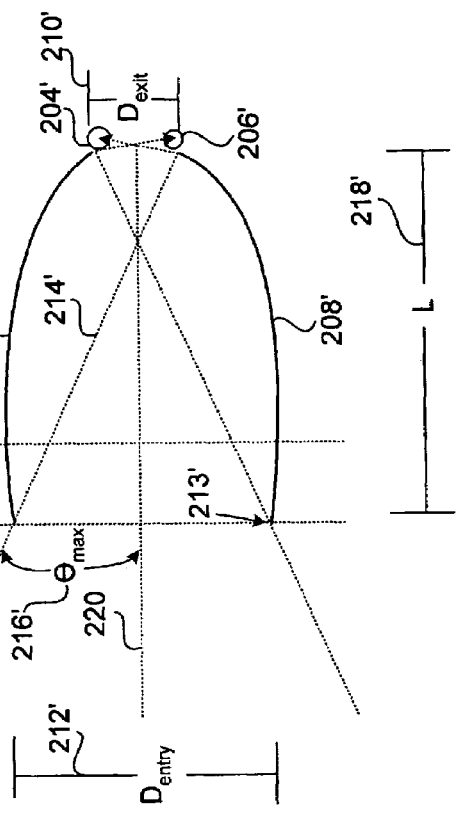
FIG. 10B is a cross-sectional view of a non-imaging photon concentrator, defined herein as a Pate collector, used in some embodiments of the invention.

Compound parabolic concentrators in general are well known to those skilled in the art of solar collection. A compound parabolic concentrator in general for a solar collector includes an energy receiver positioned between two trough-like sidewalls that reflect substantially all incident energy received over a predetermined angle onto the energy receiver. The profile curves of at least portions of the reflective sidewalls are concavely shaped consistent with reflecting maximum energy rays onto the energy receiver. For instance, as explained further herein, FIG. 10A illustrates an exemplary CPC 200 having a curve shape of an off-axis tilted parabola. Information provided in W. T. Welford and R. Winston "High Collection Nonimaging Optics" (Academic Press, 1989) may be used to determine parameters (e.g., $D_{entry}$, $D_{exit}$, L, and $theta_{max}$) of the CPC 200. FIG. 10B illustrates an exemplary NIPC 200' that is a modified compound parabolic collector, defined herein as a "Pate" collector that improves performance over the CPC 200 for optical display systems.

Various embodiments of the NIPC may also be made of a material such as a clear glass, polymer, clear polycarbonate, a clear plastic, or other optically transparent material. The embodiments may be hollow or solid. A hollow embodiment may be coated on the inside with a highly reflective metal such as silver, enhanced aluminum, rhodium, or preferably a high reflectivity dielectric stack.

The luminous flux gain achieved is possible because various embodiments of the NIPC concentrate and couple more of the light from the light source into the optical path of the projection optics. It should be understood that for an exemplary elliptical mirror, the plasma fireball has the shape of a hot dog or cylinder. This plasma cylinder is an extended source in volume space and is thus far from an ideal point source image. An actual point source image could be imaged to a point source limited only by the aberrations and diffraction of the imaging lens. It should be understood that such an extended plasma cylinder source is placed at the first focus (object point) of the elliptical mirror. The center of this plasma cylinder is collocated with the object point of the elliptical mirror. This placement results in the ends of the plasma cylinder being located short and long of the focus and thus are imaged to conjugate points that are long and short of the second focus (image point) of the elliptical reflector. These two points are also imaged with larger and smaller magnifications than the center of the plasma cylinder. This aberrational result creates a final image of the plasma cylinder that has the three dimensional shape of a second of a cone. The rays at one plane that is called the second focus (image point) of the elliptical reflector will have a large caustic of rays with a large spatial and range of angular ray orientations. Conventionally, the image point is located at the entrance of the integrating rod. However, because of physical aberrations both from the cylinder of light and the ellipse, not all of the light is captured by a finite sized integrating rod aperture. In fact, simulation shows that a significant portion of the light is not coupled into the integrating rod but reflected back or not coupled therein. For example, the integrating rod might only capture 60% of the energy.

With the image point of the light source positioned substantially near the entry aperture of the NIPC, the embodiments of the NIPC collect more light from the light source and couple it to the spatial homogenizer thereby enabling a digital projector to deliver more light or lumens to the screen for a given wattage of a particular type of bulb. Empirical modeling of the NIPC demonstrates that approximately a 25% improvement in the luminous flux at the exit of the spatial harmonizer using this invention compared to the spatial homogenizer alone.

Putting a NIPC onto the front of the integrating rod and placing the image point of the light source at approximately the entrance of the NIPC: 1) increases the diameter of the collector where light is captured at the second focal point of the ellipse, and 2) captures larger ray angles and couple them into the integrating rod. Empirical modeling on a particular system reveals that the integrating rod by itself delivers a luminous flux of about 6400 lumens at the exit of the rod from a 10,500 lumen bulb. The empirical modeling reveals that an NIPC with a Pate collector coupled with an integrating rod delivers 8032 lumens, a substantial and significant improvement of over 25% more light entering the projection optics.

One aspect of the light exiting the integrating rod is that the maximum ray cone half-angle may increase with some embodiments of the NIPC coupled to the front of the integrating rod. However, a two or three element condenser lens or other correctional optics can collect most of these rays and get them imaged at a desired cone half-angle towards the SLM.

There are several methods of manufacturing NIPC embodiments: One method is to form a rough hollow shape in a cylinder and then single point diamond turning (SPDT) the hollow shape within the cylinder. Another approach is to create two parts that are electroformed with a seam along the optical axis. Alternatively, the two parts can be electroformed as two parts with a seam perpendicular (transverse) to the optical (longitudinal) axis. In addition, various casting methods are known in the art and used for quality optical surfaces.

While the NIPC can be made from solid optical material, it is possible that the heat from the mercury arc lamp if not properly controlled can solarize and degrade the transmission properties of solid optical materials. Therefore, the preferred embodiment of an NIPC is to make it from a reflective hollow shape with a high reflection enhanced metal or dielectric high reflection coating. More information about the manufacturing steps is detailed in FIG. 9.

FIG. 2 is a block diagram of an embodiment of an optical imaging system that incorporates the invention. The light path through the optical system is illustrated with dot-dash lines. Other signals are shown as solid lines. A light generator 12 includes a light source 10, a non-imaging photon concentrator (NIPC) 30, a spatial homogenizer 20 and a gamut generator 56 (for creating color). The light source 10 preferably includes an imaging lens that is reflective, refractive, diffractive, or combinations thereof. The gamut generator 56 for creating color can be optionally incorporated at different points in the light generator or even anywhere in the optical path before the projected light enters the human eye. For instance, the gamut generator 56 can be integrated into the light source 10, it may be placed after the light source 10, the non-imaging concentrator 30, or the spatial homogenizer 20.

The light from the light generator 12 is optically coupled to the spatial light modulator 40. A controller 54 that receives analog or digital input from a video or picture source data input 52 controls the SLM 40. The light from the SLM 40 is then optically coupled to the imaging optics 50 for projection or imaging on a target 60. Such targets 60 include a projection screen, a wall, a translucent screen, or other display device, such as an active screen. An active screen allows for optical amplification of the image projected on it. In addition, the gamut generator 56 can be incorporated after the spatial light modulator 40, the imaging optics 50 or even incorporated into the target 60, such as with an active screen.

FIG. 3 is an exemplary embodiment shown in a schematic cross-section showing exemplary ray traces. The bulb 70 is partially enclosed by an imaging photon concentrator such as an elliptical mirror 13. A substantial portion of the light from the fireball 17 at a first focal point is focused to an image point 14 at a second focal point with focused light 15. A portion of the light from the bulb 70 is either not reflected off the elliptical mirror 13 or is not focused at image point 14 if the fireball 17 is not located properly. This light is shown as stray light 11 and 11'. NICP 30 increases photon collection by collecting stray light 11. Stray light 11' is shown as not being collected in this embodiment but may be collected by other embodiments disclose within. An exemplary NIPC 30 is shown as a compound parabolic collector (CPC) 32 that has a CPC entry 33, preferably re-entrant. The focused recreated plasma fireball 17 at its center in image point 14 is preferably disposed at or near the CPC entry 33 at a distance 31 (preferably zero, although this optical architecture allows for tolerance in actual focus positioning) to maximize the amount of light collected and coupled to an integrating rod 22. The light entering the integrating rod 22 from exit 35 of CPC 32 is reflected from the internal surface to create a uniform distributed light source at exit of the integrating rod. Depending on the design of the NIPC used, the light exiting the integrating rod may have a larger cone half-angle at exit 26' than at the exit 26 of an integrating rod (FIG. 1) without the CPC.

For example, an exemplary projection system has a typical exit cone half-angle of about 28 degrees. When a CPC is added, the exit cone half-angle becomes about 50 degrees. In this exemplary system the elliptical mirror has a diameter of about 32 mm. The entry to the CPC has an entry diameter of about 8.95 mm, a length of about 18 mm and an exit diameter of about 4.92 mm. The integrating rod has a width of about 6.25 mm and a height of 4.9 mm. Both the CPC and the integrating rod are preferably hollow with high reflectivity dielectric coated surfaces. In this embodiment, the CPC is rotationally symmetrical and the integrating rod has a rectangular shaped transverse cross-sectional profile.

The spatial homogenizer is optionally made of an optical material such as clear glass, clear polycarbonate or clear plastic. The spatial homogenizer may be hollow or solid. A hollow homogenizer may be coated on the inside with a high reflectivity metal such as silver, enhanced aluminum, rhodium, or a multilayer dielectric high reflector to provide a reflective layer.

The spatial homogenizer and the NIPC may be formed integrally or fabricated separately and secured together. The cross-section of the integrating rod is or rectangular or a combination of an even number of opposing similar angles. Preferably, the cross-section aspect ratio of the integrating rod matches the geometry of the SLM to maximize light throughput in the system and allow for symmetric magnification ratio, otherwise an anamorphic magnification ratio is required and may require more elements that increase cost and lowers efficiency. Other spatial homogenizers include four sided truncated pyramidal integrating rods. When the entrance of such a pyramidal is smaller than the exit, it forms a divergent integrating rod. The light rays leaving the divergent integrating rod has smaller exit ray cone half-angles than the light entering the rod. When the entry is larger than the exit of a converging pyramid integrating rod, the exit ray angles have a larger half-cone angle to preserve etendue.

FIG. 4 is cross-sectional schematic diagram of an alternative embodiment of the invention that uses two non-imaging photon concentrators as a dual NIPC 38 to increase the amount of light collected from the light source. An imaging photon collector such as elliptical mirror 13 encloses bulb 70 that creates a fireball 17 at a first focal point. The focused light 15 is directed to a second focal point to create image point 14 that is located approximately at the entrance of a first NIPC, CPC 32. Attached to the entry aperture of CPC 32 is a second NIPC 34, preferably another CPC with an entry aperture larger than its exit aperture. The exit aperture of the NIPC 34 is the same dimension as the entry aperture of CPC 32. The entry aperture 33' of NIPC 34 is preferably the same size as the exit diameter of the elliptical mirror 13 thereby allowing stray light 11' to also be collected and reflected to the exit aperture 37 of dual CPC 38. Optionally, the elliptical mirror 13, NIPC 34, and CPC 32 can be formed into a single unit for mating with bulb 70. Optionally, there may be cutouts 97 (see also FIGS. 12–15) within the single unit to allow for a cooling hole inlet and outlet. See discussion on FIGS. 12–15 for other single unit integrated embodiments.

In this embodiment, the NIPC 34 is used to capture any light that is not focused by the elliptical mirror 13 and concentrates it into the CPC 32. The CPC 32 also concentrates the light focused by the elliptical mirror 13 and combines it with the light received from NIPC 34 and couples it to the CPC exit aperture 37. When formed as a single unit, substantially all of the light emitted from bulb 17 is coupled to the exit aperture 37, less internal reflection losses.

FIGS. 5A–5F are cross-sectional views of several different embodiments for locating the gamut generator 56, shown as a color wheel 16, when a NIPC 30 is incorporated into an optical system of a projector system. Although a single CPC 32 NIPC is exemplary shown, it should be noted that any of the alternative NIPC embodiments illustrated herein could be substituted and still meet the spirit and scope of the invention.

In FIG. 5A, the color wheel 16 is placed in front entry aperture of CPC 32 which has an integrating rod 22 coupled to its exit aperture. In this embodiment, because the CPC 32 entry aperture has a larger diameter than the integrating rod entry aperture, the light striking it will cover a larger portion of the color wheel. This effect will result in a larger period of time during color transitions in which there will not be a single color present. This may result in less time being available during each color period in which to modulate the SLM for each respective color. One method of correcting this effect is to use a proportionally larger color wheel so that the time presented remains the same.

FIG. 5B, illustrates an embodiment in which the color wheel 16 is located at the exit aperture of the integrating rod 22. The entry aperture of integrating rod 22 is coupled to the exit aperture of the CPC 32. In this approach, the light striking the color wheel will be somewhat larger than if the color wheel is placed in front of the integrating rod 22 as the light entering the integrating rod 22 is converging as it is focused to a point and the light exiting the integrating rod is diverging. Thus, the light striking the color wheel when placed after the integrating rod will have a larger cross-sectional area than when the color wheel is placed in front of the integrating rod 22.

In FIG. 5C, the color wheel 16 is placed between the exit aperture of the CPC 32 and the entry aperture of the integrating rod 22. Although the color wheel is placed before the entry aperture of the integrating rod 22, the light emerging from the exit aperture of the CPC 32 may have a larger divergence cone half-angle than would exist in a conventional system (see FIG. 1) where the light is focused at the entrance of the integrating rod 22. Because, the integrating rod 22 in this example is simply a rectangular box, the angle of the light entering the integrating rod is the same as the light exiting the integrating rod. Therefore, while this embodiment might be beneficial for locating the color wheel for a particular physical layout, it still has a slightly smaller cross-sectional area (an inscribed circle) for light striking the color wheel than if the CPC 32 where not present.

In FIG. 5D, the color wheel 16 is placed between two sections of an integrating rod 22A and 22B. The first section of the integrating rod 22A is coupled to the CPC 32. The second section of the integrating rod 22B is coupled to receive the light that traverses through the color wheel 16. Again, due to the rectangular box structure of the integrating rod 22, the cross-sectional area of the light striking the color wheel is the same as if the color wheel 16 where placed at the entry or exit of the integrating rod 22 when the CPC 32 is present.

In FIG. 5E, an additional lens is place in front of the color wheel 16 as corrective optics 36 to reduce the divergence of the light exiting the CPC 32 before it reaches the color wheel 16 and enters the integrating rod 22. The corrective optic 36 can be used to correct the angle of divergence of the light that was increased due to the CPC 32.

In FIG. 5F, two additional lens 36A and 36B are placed on each side of the color wheel 16. In this embodiment, the light from the CPC 32 exit aperture is strongly converged by the first lens 36A to reduce the cross-sectional area of the light cone half-angles that enters the color wheel 16. The second lens 36B can be either concave or convex in order to converge or re-diverge the light leaving the color wheel 16. If concave, then the second lens 36B can further reduce the angle of light entering the integrating rod 22 to better couple the light through the rest of the imaging optics. If convex, then the second lens 36B can re-diverge the light to bring it back to an angle that allows the light exiting the integrating rod to better couple with the imaging optics.

FIGS. 6A through 6E are cross-sectional sections of several possible embodiments of the NIPC which include at least one CPC 32 with different options for reducing the cone half-angle of divergence leaving the exit of the NIPC. Other NIPC embodiments describe within, for example a Pate collector to name one, can be substituted for CPC 32 and still fall within the spirit and scope of the invention. These embodiments allow for a drop-in design with existing projector systems. The cone half-angle of divergence that leaves the embodiments of the NIPCs is preferably chosen to match that normally expected to enter the entry of the integrating rod 22. For example, the same cone half-angle as the focus of the elliptical mirror 13 (see FIG. 1).

Figure 6E:
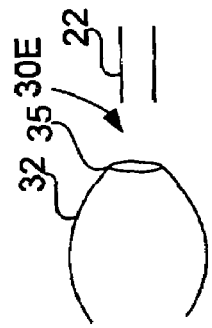
Figure 6A:
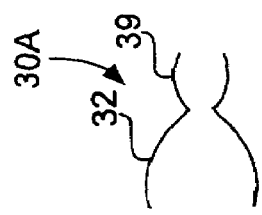

FIG. 6A illustrates a NIPC 30A with a CPC 32 optically coupled to a second CPC 39. The CPC 32 has an entry aperture larger than its exit aperture. The second CPC 39 is rotated 180 degrees such that its entry aperture is less than its exit aperture. The entry aperture of the second CPC 39 is substantially the same diameter as the exit aperture of CPC 32. The second CPC 39 is used to reflect rays preferably back to the angle of divirgence that would normally be expected into the integrating rod for a conventional system. The exit diameter of the second CPC 39 is preferably matched to interface with the dimensions of the integrating rod entry. The focal point of the light entering CPC 32 is located at substantially the plane of its entry aperture. The transverse cross-sectional profiles may be the same or different for the CPC 32 and CPC 39. For instance, the CPC 32 may have a circular transverse cross-sectional profile and the CPC 39 may have one that is rectangular in shape. Optionally, they may both be circular or both be rectangular.

Figure 6B:
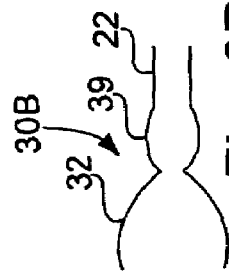

FIG. 6B illustrates an NIPC 30B that incorporates an integrating rod 22. The integrating rod 22 has an entry aperture that is optically coupled to the exit aperture of the second CPC 39. The integrating rod 22 not only helps to spatially harmonize the light but converts the rotationally symmetric light exiting from the second CPC 39 to a geometric cross-sectional shape, preferably rectangular, that matches the cross-sectional profile of the spatial light modular located further down the optical system (for example, see FIG. 2).

Figure 6C:
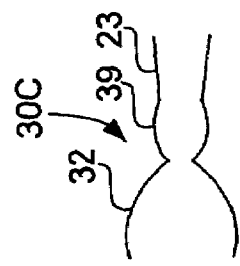

FIG. 6C illustrates a NIPC 30C that incorporates a flared integrating rod 23 as a spatial homogenizer. This flared integrating rod 23 has an entry aperture with a smaller cross-sectional area than its exit aperture. The entry aperture of the flared integrating rod 23 is optically coupled to the exit aperture of the second CPC 39. The flared integrating rod 23 is used to convert the maximum cone half-angle of exit leaving the CPC 39 to a lesser angle. For example, the flared rod may be a four-sided pyramid or a nonsymmetrical pyramid. This has the additional benefit of allowing the maximum exit cone half-angle to be reduced to a smaller angle without having to further rotate the optical axis of the second CPC 39 parabolas. Thus, additional design freedom is attained.

FIG. 6D is a NIPC 30D that includes a first CPC 32 such as a Pate collector that has a maximum half-angle of divergence less than 90 degrees and a flared integrating rod 23 optically coupled to the exit aperture of CPC 32. This design allows for requiring only one CPC, thus allowing for more tolerance in manufacturing.

FIG. 6E is a NIPC 30E that includes an optical condensing lens 35 used to adjust the exit angle of the photons emerging from the exit aperture of CPC 32. The light leaving the exit aperture of CPC 32 is refracted by condensing lens 35 to the desired angle before it enters the entry aperture of the integrating rod 22. Optionally, the condensing lens 32 could be disposed at the entry aperture of integrating rod 22.

FIGS. 7A–7D are exemplary embodiments of a few of many other possible implementations of non-imaging photon concentrators 30.

Figure 7A:
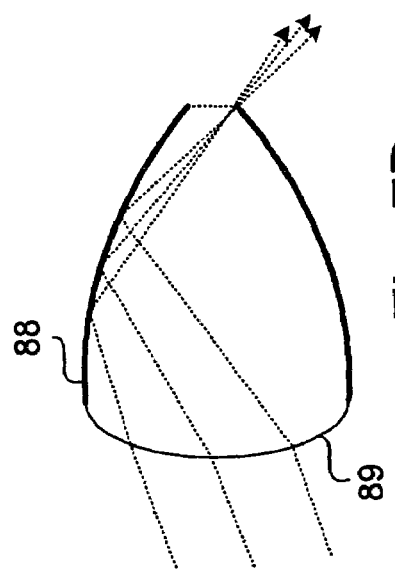
FIGS. 7A–7D are exemplary cross-sectional views of various additional alternative embodiments of the invention.

FIG. 7A is a cross-sectional profile of a compound hyperbolic collector 80, also known as a "trumpet" collector. A conventional hyperbolic collector will reflect rays entering between the two hyperbolic sections, one or more times depending on the angle of entry, before exiting at a maximum divergence angle of 90 degrees. In this embodiment, the two hyperbolic sections that make up the compound hyperbolic collector 80 are each over-rotated about the optical axis to decrease the maximum divergence cone half-angle to less than 90 degrees. This embodiment may be less efficient that the CPC 32 as light entering the collector may be repeatedly reflected resulting in additional losses. However, this embodiment may allow for a wider angle of incoming light, thus allowing for more light to enter the collector for a given entry aperture opening. Thus, this embodiment may be particularly useful when the light source is not imaging to a point source but has a large image point focused at the entry of the collector.

Figure 7B:
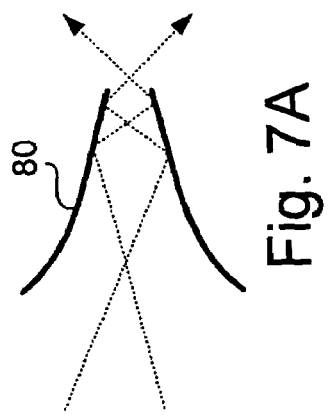

FIG. 7B is another embodiment of a non-imaging photon concentrator 30 shown in cross-sectional profile. In this embodiment, the NIPC has a fresnel lens 82 located at the entry aperture that is curved and shaped to direct light entering the collector to the exit aperture of the collector. The collector also has a conical shaped reflector 84 that reflects light that is not directed directly to the exit aperture to the exit aperture. The maximum half-angle of divergence of the light leaving the exit aperture is determined by the angle of the conical section 84 and the design of the Fresnel lens 82.

Figure 7C:
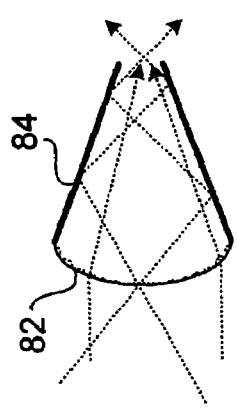

FIG. 7C is another exemplary embodiment of a non-imaging photon concentrator shown in cross-sectional profile. In this embodiment a modified CPC 90 is formed of at least two sections. The entry section is formed of a compound parabolic profile as a conventional CPC. The exit section is formed of a conical section 92 restricts the angle of entry of the collector to an angle of less than 90 degrees. This modified CPC 90 is also known as a theta 1 to theta 2 converter. That is, it transforms light having a maximum entry angle of theta 1 to light exiting the concentrator to an angle theta 2 that is greater than theta 1 but less than 90 degrees. This embodiment attempts to only affect the last reflection of a ray before exit of the CPC.

Figure 7D:
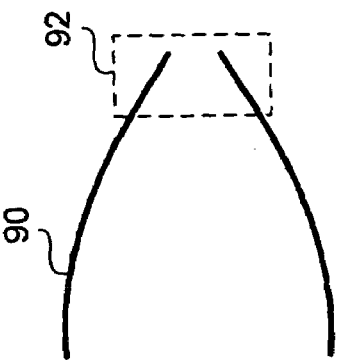

FIG. 7D is another embodiment of the non-imaging photon concentrator shown in cross-sectional profile. In this embodiment, the non-imaging photon concentrator is a dielectric total internal reflection (DTIR) CPC 88. Preferably, but optionally this DTIR CPC 88 is modified from a conventional design such that the compound parabolic sections are over-rotated such that the maximum half-angle of divergence of light leaving the collector is less than 90 degrees. The DTIR CPC 88 is formed of an optical glass or other dielectric material. This solid body approach allows for the entry aperture to have a curved entry 89 thus allowing for a wider angle of light to enter the DTIR CPC 88 than that allowed in a reflective only CPC. Optionally the curved entry could be concave.

FIGS. 8A–8D are exemplary embodiments of just a few of the possible light sources that create an image point 14 that is formed substantial at the entry aperture of the non-imaging photon concentrator 30 (see FIG. 3).

FIG. 8A is an elliptical light source with a bulb 70 and a partial elliptical mirror 13. The shape of the partial elliptical mirror is such that light from a first focal point of the ellipse, such as at the location of fireball 17, is reflected and forms an image point 14 at the second focal point of the ellipse. The ellipse can be shaped to form the image point close to the exit aperture of the mirror at the expense of more optical precision required in the manufacturing of the mirror. Less precision is required if the image point 14 is located further from the exit aperture of the elliptical mirror, however the length of the optical path becomes greater. Another benefit of locating the image point 14 further from the elliptical mirror exit is that the cone half-angle of convergence in forming the image point 14 is less than when the image point 14 is formed closer to the exit aperture. This results in not only less distortion of the image point but also helps to couple the image point 14 into the integrating rod 22. Although the image point 14 is shown as a round fireball, the actual fireball of many light sources is not a perfect point source. Thus, the resulting image formed at image point 14 will often be only an approximation of the fireball 17 at the first focal point and also will be distorted. This distorted image is not fully coupled into the integrating rod with conventional projector designs, thus creating for an inefficient light source.

Another conventional light source is shown in FIG. 8B. In this embodiment, a parabolic light source 74 has a bulb 70 that forms a fireball 17 at a focus of a parabola 72. The light leaving the focus of the parabola is reflected off the parabola to create a substantially collimated (parallel) light path that is then imaged to an image point by a condensing lens 74. This approach allows for more flexibility in designing the length of the light path because the optics of condensing lens 74 forms the image point 14, thus the reflector can be made with less tolerance. This approach is generally less efficient that the elliptical mirror and adds an additional element, thus increasing the weight, length, and cost of the light source.

FIG. 8C is an embodiment of a modified elliptical light source 78 that combines an elliptical reflector 13 with a reducing lens 79 to create a shorter optical path than that of the elliptical reflector 13 alone. This approach allows for less tolerance in manufacturing the elliptical reflector 13 by allowing it to have a small angle of convergence. The reducing lens 79 is used to increase the angle of convergence of the image point 14 thus also reducing the path length of the light source.

One advantage of an optical path with the non-imaging photon concentrator is that it can be designed to encompass several different fireball sizes thus allowing for more tolerance in alignment of the imaging light source and interoperability of different light sources. A conventional projector design is generally limited to a single light source having a well-defined fireball imaged to a particular image point. However, a projection or other imaging system using the non-imaging photon concentrator can allow for different types of light sources than conventional mercury arc lights. For instance, light sources such a Xenon have longer operating lives and are whiter than mercury bulbs but may not have as much light output for a given wattage and generally do not form as small a point source. By incorporating the non-imaging photon concentrator and imaging the Xenon fireball at an image point in front of the entry aperture of the NIPC, the efficiency of the Xenon light source is improved, thus allowing for a mercury-free light source solution. Thus the bulb 70 in any of the embodiments may be replaced with a non-mercury light source such as Xenon, Sodium, or Halogen based lights to just name a few. In fact, several different light sources that are non-point sources may be used.

For instance, as shown in FIG. 8D, solid state light sources such as a light array 76 having multiple red (R), green (G), and blue (B) elements many be used. Optionally, white (W) elements can be added to increase the contrast. The light array 76 can be implemented with solid-state light sources such as light emitting diodes or laser diodes. Light that is emitted from the array either orthogonally to the plane of the array (light beam 77 as with collimated laser diodes) or divergent from the axis normal to the surface of the array (divergent light beam 75 as with LEDs) is focused by a reducing lens 79 to an image 64 that is not an actual point source but equivalent to image point 14. Optionally, a solid state LED array with an array of collimating lenses can be substituted for collimated laser diodes. However, because the NIPC collects light over a range of incoming angles and exits the light at a known maximum half-angle of divergence, substantially all the light from the light array 76 is optically coupled to the optical path. By using a light array as shown, the gamut generator 56 (FIG. 2) is incorporated into the light source, thus eliminating an expensive color sequencer such as a color wheel 16, since the different color sources may be energized sequentially.

The NIPC can be manufactured as a stand-alone part or incorporated with other portions of the light path optics to minimize cost and reduce assembly tolerance issues. Although several different manufacturing technologies exist for creating optical components, several different methods may be combined non-intuitively but advantageously to create the high efficiency desired for the NIPC.

Figure 9:
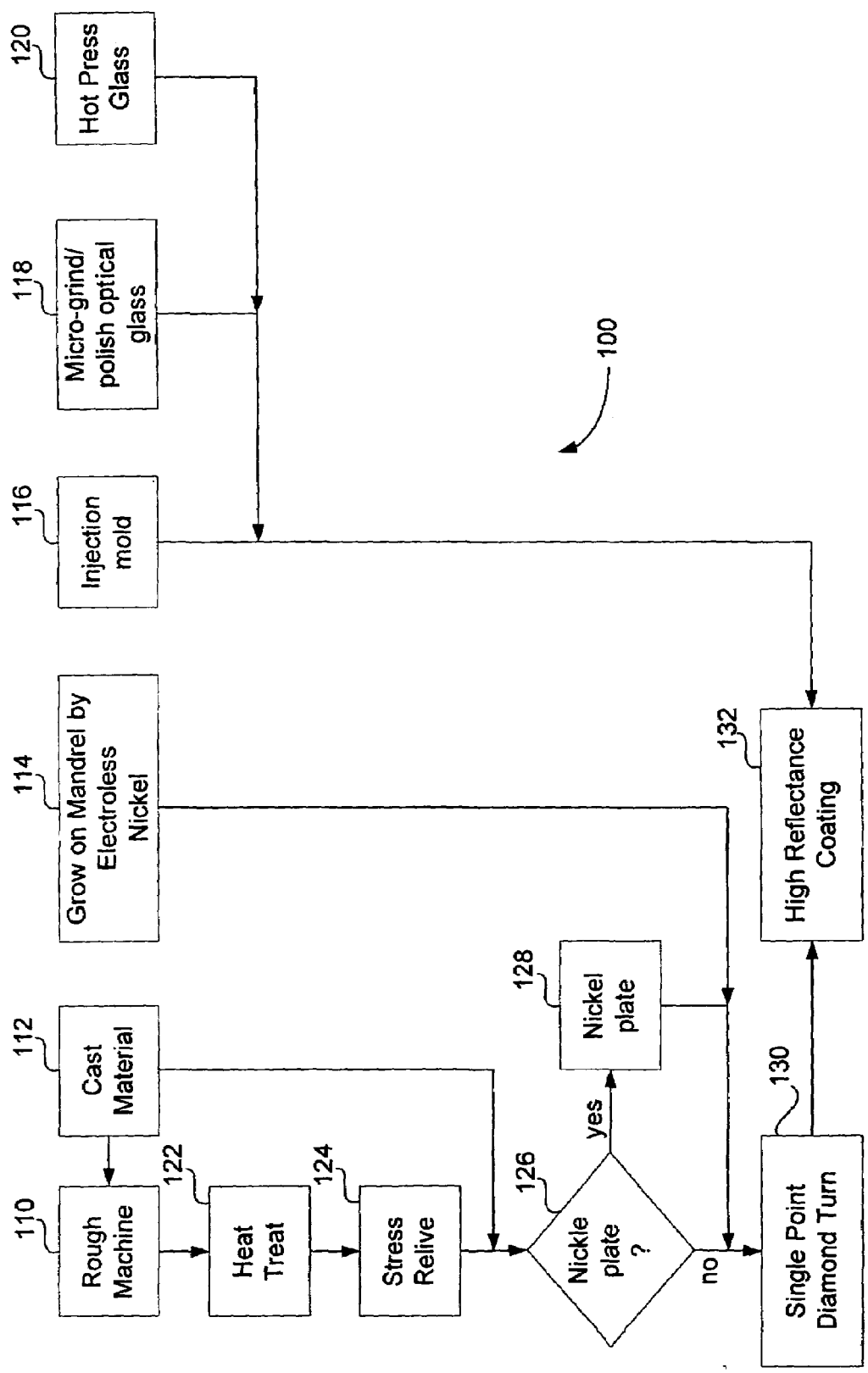
FIG. 9 is a block diagram illustrating exemplary manufacturing steps available to construct embodiments of the invention.

For instance, FIG. 9 is a flow chart representing several different combinations of manufacturing steps 100 possible to create an NIPC alone or in combination with other optical elements. An aluminum alloy such as 6061, 7000, or 1000 series can be rough machined (block 110) to near the desired shape and then optionally heat treated (block 122) and/or optionally stress-relieved (block 124) to a known standard such as MIL H 6088. Optionally, one could decide to nickel plate (block 126) the aluminum surface and if so plate the aluminum with nickel (block 128). Either way, the aluminum alloy part is then single-point diamond turned (SPDT) to create an optical finish (block 130). Optionally, the optical finish can be coated with a highly reflective coating (block 132) to minimize reflective losses. Optionally, rather than rough machining, a part could be fabricated by casting (block 112) a metal, ceramic, or composite to near the desired shape and then performing the other optional steps of rough machining, heat treating, stress relieving, nickel plating and then SPDT and optionally high reflective coating the optical surfaces. Another option rather than rough machining or casting is to grow the part in preferably multiple pieces, such as two halves, on a mandrel for instance with an electro-less nickel process (block 114) and then SPDT (130) and optionally coat with a high reflective material (132).

Other possible NIPC devices alone or in combination with other optical components can be formed of solid optical material using injection molding (block 116), micro-grinding or polishing of optical glass (block 118), or hot pressing glass (block 120). One possible high temperature plastic would be cyclic olefin polymer. Optionally, the formed optical glass can be coated with a high reflectance coating (block 132) at all angles of incidence to improve efficiency.

FIGS. 10A and 10B are cross-sectional views of two of many possible non-imaging photon concentrators 30 that can be used in embodiments of the invention. A Winston collector, a CPC 200 is a conventional solar collection device that admits light rays extending from a $\theta_{max}$ 216 half-angle in all directions off the longitudinal center axis 220. The amount of light concentrated is determined by the ratio of the $D_{entry}$ 212 to the $D_{exit}$ 210.

i.e. Concentration ratio=$D_{entry}/D_{exit}$=1/sin($\theta_{max}$)

The compound collector is made up of two parabola sections 202, 208 that have their focus at the start of the other parabola section at the $D_{exit}$ 210.

For example, section 202 has its focus 206 on the exit end of section 208. Section 208 has its respective focus 204 at the exit end of section 202. This positioning of the focal point at the respective ends of the opposite sections results in the light exiting the CPC 200 to have a cone of half-angles extending to 90 degrees. This is acceptable for a solar collector that is simply adsorbing the energy on a collector at the exit or projection into the exit aperture. However for a display system, some of the light will not be coupled into the integrating rod and other light near 90 degrees will reflect may times before exiting the integrating rod resulting in significant loss. The length (L) 218 of the CPC 200 is determined from the desired concentration ratio and the desired angle of acceptance $\theta_{max}$ 216.

i.e. Length of collector=$L=(½)(D_{entry}+D_{exit})\cot(\theta_{max})$

Also, each of the sections of the parabolas have a normal 213 to the surface at the entrance aperture that is orthogonal with the longitudinal center axis 220 of the CPC 200.

FIG. 10B is an improved compound parabolic collector, defined herein as a "Pate" collector, that is a non-imaging photon concentrator (NIPC) 200'. It has several improvements that increase the amount of light coupled into the light path of the projection optics and reduces its length allowing for easier incorporation into the light path optics. The NIPC 200' has an entry aperture opening $D_{entry}$ 212' and an exit aperture opening $D_{exit}$ 210'. When keeping the exit aperture the same diameter as the exit aperture of CPC 200 of FIG. 1A, the various differences are highlighted. Of course, the actual design parameters can be adjusted to match a particular optical design. The NIPC 200' has two parabolic sections 202' and 208' that are over-rotated such that their respective focal point 206', 204' are located and extended to the right of the exit aperture of FIG. 10B. This over-rotation means that the light exiting the NIPC 200' will have cone half-angles of less than 90 degrees. This means that all of the light exiting the NIPC 200' will be able to be reflected down an integrating rod or other spatial homogenizer, although the number of reflections will depend on the maximum cone half-angle of divergence chosen by the over-rotation and the length of the integrating rod. Assuming that the half-angle of acceptance $theta_{max}$ 216' remains the same as the $theta_{max}$ 216 CPC 200 of FIG. 1A, the length of the parabola sections 202' and 208' are shortened as shown in FIG. 10B. This results in a shorter length L 218' for the concentrator.

Also, the entry aperture of NIPC 200' has a re-entrant profile, that is, the entry aperture, $D_{entry}$ 212' has a smaller diameter than the maximum diameter 215 of the NIPC 200'. Thus, the NIPC 200' has an entry aperture that is smaller than a mid-section cross-sectional profile at the maximum diameter 215 and an exit aperture smaller than the entry aperture. This results in a section 201 of the NIPC 200' that has an angle sloping in a different direction than the rest of the parabolic section. Thus, each parabola segment 202' and 208' have a normal 213' to the surface at the entry aperture of the NIPC 200' that is not completely orthogonal to the longitudinal center axis 220. The section 201 captures additional light at an angle greater than $theta_{max}$ 216' that is coupled to the exit aperture of NIPC 200' increasing its efficiency. This section 201 is particularly useful when there is misalignment of the fireball, or a non-point source fireball is used as a light source.

Figure 11:
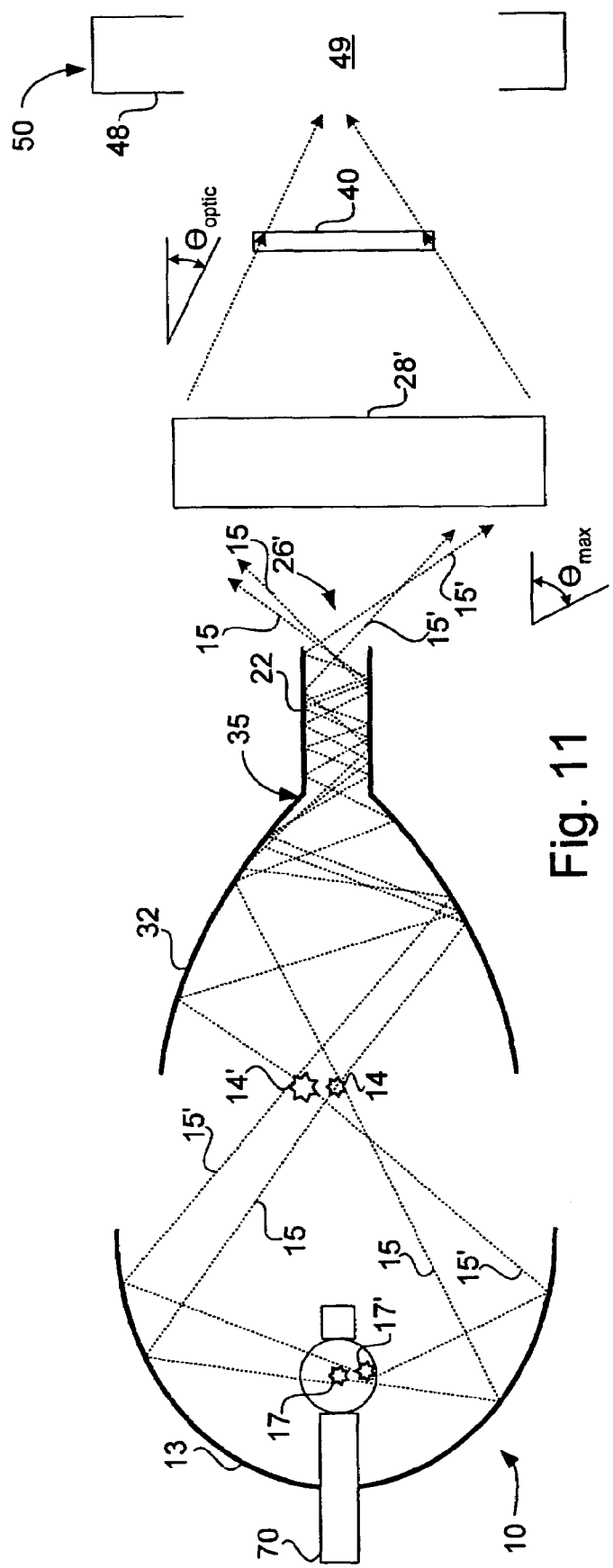
FIG. 11 is a cross-sectional schematic view of an exemplary projection optic system that incorporates embodiments of the invention.

FIG. 11 is an exemplary implementation of the NIPC 30 into an optical projection system, illustrating some of its advantages. This embodiment illustrates the tolerance to 'fireball positioning' or 'image point focusing' made possible. In this embodiment, the light source 10 includes an elliptical mirror 13 having a short focus path to image point 14 is used. The bulb 70 creates a fireball 17 and if misaligned or due to several other possible issues, the fireball 17 is dislocated from the first focal point to form a second fireball 17'. The ideal fireball 17 and the second fireball 17' or shown imaged at the second focal point of elliptical mirror 13 as image point 14 and second image point 14', respectively. Focused light 15 is emitted from the ideal fireball 17 and forms the image point 14. The dislocated second fireball 17' forms the slightly unfocused light 15' at the second image point 14' that is not located at the second focal point but a short distance from it. Also, the second image point 15' has a slightly different magnification than that of an ideal image point 14. If the second image point 15' where formed at the entry aperture of the integrating rod 22, some of the light would not enter the integrating rod 22 thus resulting in a loss of efficiency. However, as shown, the image point 14 is placed substantially at the entry aperture of the NIPC 30, and thus also the second image point 14' is also place substantially near the entry aperture of the NIPC 30. Because the entry aperture 32 has a larger diameter opening than the exit aperture that is sized in relation to the entry aperture of integrating rod 22, more light is collected and reflected from the parabolic surface of NIPC 30 into the integrating rod 22 at the exit aperture 35 of the NIPC 30. Because the light leaving the NIPC 30 has a maximum divergence cone half-angle preferably less than 90 degrees using a Pate collector, this light will be reflected within the integrating rod 22 and exit with the same maximum divergence angle (for a non-flared integrating rod 22). Optionally, a corrective optics 28' can be included to change the maximum cone half-angle of divergence to that required by the imaging system 50 to optionally fill the spatial light modulator 40 and remain within the input aperture 49 of the projection optics 48. The corrective optics 28' can be implemented as reflective, refractive, diffractive, or otherwise optically as required. The corrective optics 28' can also be integrated or merged into the integrating rod 22, NIPC 30, or eliminated by redesigning the downstream projection optical path.

FIGS. 12–15 illustrate only a few of many possible integrated embodiments. This integrated architecture allows for an exchangeable bulb/reflector assembly or tolerance in locating the bulb in a bulb exchange only embodiment.

FIG. 12 is an embodiment of a first integrated NIPC reflector shown in cross-section. In this embodiment, an integrated NIPC reflector 94 has two sections that mate together along the longitudinal AA axis shown. This use of two sections allows for easy manufacturing and coating of the reflective surfaces as described previously (see FIG. 9). Each section has a first curved section left of the BB axis shown which includes an elliptical reflector 13 having an eliptical shaped surface to focus light from the fireball 17 of bulb 70 to the image point 14 substantially on the intersection of the AA and BB axes. The curved surface to the right of the BB axis shown is an NIPC 30 that is used to concentrate the light from the bulb 70 to the exit aperture 35 at a known maximum half-angle of divergence that preferably is less than 90 degrees. Optionally, the integrated NPIC reflector has a cutout 97 to provide for a cooling air flow (also shown in FIGS. 13–15).

FIG. 13 is an alternative embodiment of a second integrated NIPC reflector 96 that incorporates a spatial homogenizer at the exit aperture 35 of the NIPC 30. Light that is collected from the bulb 70 is further homogenized and spatially transformed to match the cross-sectional area shape (in ratio) of the spatial light modulator when exiting from the exit aperture 26' of the reflector. FIG. 13 illustrates an embodiment in which the integrated NIPC reflector 96 is formed of two sections, the elliptical mirror 13, left of the CC axis, and the NIPC 30/spatial homogenizer 20. In this embodiment, the spatial homogenizer 20 is shown as an integrating rod but other spatial homogenizers could be substituted.

FIG. 14 is an alternative embodiment of a third integrated NPIC reflector 96 that includes an elliptical reflector 13 section, an NIPC 30 section, a spatial homogenizer 20 section and angle corrective optics 98. The section left of the DD section contains the elliptical shaped portion which focuses the fireball 17 of bulb 70 from a first focal point of the ellipse to a second focal point to form the image point 14 substantially at the entry aperture of the NIPC 30 section. The NIPC 30 section is located between the DD axis and the EE axis. The exit aperture 35 of the NIPC 30 preferably has light emerging at a maximum divergence cone half-angle less than 90 degrees allowing the light to propagate down the spatial homogenizer 20. The angle correction optics 98 located to the right of the FF axis is used when required to convert the maximum half-angle of divergence to a smaller angle of divergence such as required to adapt to a particular projection optic light path. In this embodiment, the light source can provide a desired angle of divergence while maintaining a high level of efficiency.

FIG. 15 is an additional embodiment of a fourth integrated NIPC reflector 96' that has the angle corrective optics 98 located at the exit aperture 35 of the NIPC 30 and the spatial homogenizer 20 located aft of the angle corrective optics 98 between the EE and FF axis'. Light exits from the spatial homogenizer exit aperture 26' for further coupling into the projection light path. In this embodiment, the length of the reflection assembly can be easily adjusted by adjusting the length of the spatial homogenizer 20 section.

FIGS. 16A–C are exemplary prospective views of an integrated NIPC and spatial homogenizer that form an amalgamated NIPC (ANIPC) 240. This ANIPC 240 has a rectangular shape entry 242 and a rectangular shaped exit 244. The ANIPC 240 is formed of four walls that have compound parabolic shaped sections 246, 248 that are over-rotated to place the focus of the respective parabolas aft of the exit 244. FIG. 16D is a frontal view looking into entry 242. The inside walls are preferably coated with a high reflectivity material 250 to increase the amount of light reflected. FIGS. 16E and 16F are cross-sectional views of the ANIPC 240 showing two compound parabolic cross-sectional profiles 246 and 248, respectively.

The ANIPC 240 reduces the number of reflections required to perform both functions of concentrating and spatially homogenizing the light. This ANIPC 240 increases light throughput efficiency while reducing the optical path length required to perform the functions. By combining the light co0ncentration and spatial homogenization into a single amalgamated structure, the optical path design is simplified and a drop in replacement for an integrating rod is possible.

As shown in FIGS. 16E–F, focused light 15 from an imaging light source is directed to an image point 14 at the entry plane of the ANIPC 240. The focused light 15 strikes a wall of the ANIPC and exits at a bounded cone-half-angle $\theta_{max}$, which is preferably matched to the optical projection system. Optionally, corrective optics can be added to adapt a particular $\theta_{max}$ to that required by the projection optics. The entry 242 has a larger cross-sectional area than the exit 244 cross-sectional area as shown in FIG. 16D. Optionally, the entry 242 can be made re-entrant as discussed previously for other embodiments of an NPIC.

The compound parabolic sections 246 and 248 are preferable designed to be over-rotated to locate the focus of each parabola aft of the exit 244. For instance, first parabola 252 has a first focus 262 aft of the exit 244 and second parabola section 254 has a first focus 260 also aft of the exit 244. Third parabola section 256 has a third focus 266 aft of the exit 244 and fourth parabola section 258 has a fourth focus 264 also aft of the exit 244. Preferably, the maximum angle of divergence from both compound parabolic sections 246 and 248 are designed to be the same, however, they could be made different and corrected by corrective optics later to match that required by the projection optics. The corrective optics may be integrated with the ANIPC 240 or separately placed in the optical path. Further, the ANIPC 240 can be combined and integrated with a reflector assembly as shown and described in previous figures. Optionally, the ANIPC 240 can be made of a solid refractive optical material as discussed with other embodiments.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A light source for a projector, comprising:
   a light emitter; and
   an reflector shield around the light emitter,
   the reflector shield having a first portion interfaced with a second portion,
      the first portion having an image point of the light emitter in the proximity of the interface with the second portion,
      the second portion having a non-imaging photon concentrator with over-rotated compound parabolic sections narrowing to an exit aperture.

2. The light source of claim 1 wherein the first portion of the reflector shield is a partial elliptical shape.

3. The light source of claim 1 wherein the first portion and the second portion are integrated.

4. The light source of claim 3 wherein the integrated first and second portions are formed of at least two pieces.

5. The light source of claim 1, further comprising:
   a spatial harmonizer coupled to the second portion.

6. The light source of claim 5 wherein the spatial harmonizer is integrated with reflector shield.

7. The light source of claim 5 wherein the spatial harmonizer is amalgamated with the non-imaging photon concentrator.

8. The light source of claim 1 wherein the light emitter is a non-mercury bulb.

9. The light source of claim 1 wherein the light emitter is a xenon, halogen, or sodium bulb.

10. An electronic device, comprising:
    a controller for creating images;
    a spatial light modulator receiving the images;
    a light source focused to an image point; and
    a non-imaging photon concentrator with over-rotated compound parabolic sections coupled to the light source having,
       an entry aperture coupling to the imaging photon concentrator at the image point, and
       an exit aperture,
    wherein the entry aperture is larger than the exit aperture.

11. The electronic device of claim 10 wherein the electronic device is a projection device.

12. The electronic device of claim 10 wherein the electronic device is a presentation device.

13. The electronic device of claim 10 wherein the entry aperture has a re-entrant profile.

14. The electronic device of claim 10, further comprising a spatial homogenizer coupled to the non-imaging concentrator.

15. The electronic device of claim 10, further comprising imaging optics coupled to the spatial light modulator.

16. The electronic device of claim 10, further comprising an imaging photon concentrator coupled to the light source and further coupled to the non-imaging photon concentrator.

17. The electronic device of claim 16 wherein the light source, the imaging photon concentrator and the non-imaging photon concentrator form a replaceable unit.

18. The electronic device of claim 10 wherein the light source and the non-imaging photon concentrator form a replaceable unit.

19. A mercury free light source, comprising:
- a light bulb having essentially no mercury;
- an imaging photon concentrator coupled to the light bulb focusing the light bulb to an image point; and
- a non-imaging photon concentrator with over-rotated compound parabolic sections having,
  - an entry aperture coupling to the imaging photon concentrator at the image point, and
  - an exit aperture,
- wherein the entry aperture is larger than the exit aperture.

20. An extended-life light source, comprising:
- a xenon light bulb;
- an imaging photon concentrator coupled to the xenon light bulb focusing the xenon light bulb to an image point; and
- a non-imaging photon concentrator with over-rotated compound parabolic sections having,
  - an entry aperture coupling to the imaging photon concentrator near the image point, and
  - an exit aperture,
- wherein the entry aperture is larger than the exit aperture.

* * * * *